US012123558B2

(12) United States Patent
Jiang

(10) Patent No.: US 12,123,558 B2
(45) Date of Patent: Oct. 22, 2024

(54) STAGE LIGHT WITH CAPACITIVE ROTATION ANGLE DETECTION

(71) Applicant: Guangzhou Haoyang Electronic Co., Ltd., Guangdong (CN)

(72) Inventor: Weikai Jiang, Guangdong (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 441 days.

(21) Appl. No.: 17/514,709

(22) Filed: Oct. 29, 2021

(65) Prior Publication Data

US 2022/0057059 A1    Feb. 24, 2022

Related U.S. Application Data

(63) Continuation of application No. PCT/CN2021/075199, filed on Feb. 4, 2021.

(30) Foreign Application Priority Data

Aug. 21, 2020  (CN) .......................... 202010850371.4

(51) Int. Cl.
*F21S 10/06* (2006.01)
*F21S 8/00* (2006.01)
(Continued)

(52) U.S. Cl.
CPC ................. *F21S 10/06* (2013.01); *F21S 8/00* (2013.01); *F21V 14/02* (2013.01); *F21V 23/06* (2013.01);
(Continued)

(58) Field of Classification Search
CPC .. F21S 10/06; F21S 8/00; F21V 14/02; F21V 23/06; F21V 23/00; G01B 7/30;
(Continued)

(56) References Cited

U.S. PATENT DOCUMENTS

2001/0030269 A1* 10/2001 Evans ..................... F21V 23/06
                                                             248/231.51
2005/0092108 A1*  5/2005 Andermo ............. G01D 5/2415
                                                             73/862.626

(Continued)

FOREIGN PATENT DOCUMENTS

CN           106152932 A       11/2016
CN           207179373 U        4/2018
(Continued)

*Primary Examiner* — Feba Pothen
(74) *Attorney, Agent, or Firm* — MUNCY, GEISSLER, OLDS & LOWE, P.C.

(57) ABSTRACT

A capacitance type rotation angle detection stage light includes a pivoting member and a supporting member for supporting the pivoting member. A reflecting grating is attached on the pivoting member, and the reflecting grating rotates along with the pivoting member. A signal grating is attached on the supporting member. The signal grating and the reflecting grating are arranged oppositely. The signal grating comprises capacitance emitting pieces, a capacitance receiving piece and shielding pieces. The reflecting grating comprises capacitance reflecting pieces that reflect signals sent from the capacitance emitting pieces to the capacitance receiving piece. Periodic excitation signals applied to the capacitance emitting pieces finally form a composite signal on the capacitance receiving piece through coupling of two pairs of capacitors that the capacitance emitting pieces and the capacitance reflecting pieces, and the capacitance reflecting pieces and the capacitance receiving piece.

18 Claims, 9 Drawing Sheets

(51) Int. Cl.
*F21V 14/02* (2006.01)
*F21V 23/06* (2006.01)
*G01B 7/30* (2006.01)
*G01D 5/241* (2006.01)
*F21W 131/406* (2006.01)

(52) U.S. Cl.
CPC ............. *G01B 7/30* (2013.01); *G01D 5/2415* (2013.01); *F21W 2131/406* (2013.01)

(58) Field of Classification Search
CPC .... G01D 5/2415; G01D 5/2403; G01D 5/241; F21W 2131/406; G02B 5/1861
See application file for complete search history.

(56) References Cited

U.S. PATENT DOCUMENTS

| | | | |
|---|---|---|---|
| 2006/0133079 A1* | 6/2006 | Callahan | E04H 12/08 |
| | | | 362/242 |
| 2013/0207675 A1 | 8/2013 | Francescon | |
| 2018/0010929 A1* | 1/2018 | Li | G01D 5/2415 |

FOREIGN PATENT DOCUMENTS

| | | |
|---|---|---|
| CN | 109211092 A | 1/2019 |
| CN | 208442781 U | 1/2019 |
| CN | 111963930 A | 11/2020 |
| CN | 212298721 U | 1/2021 |

\* cited by examiner

STAGE LIGHT WITH CAPACITIVE ROTATION ANGLE DETECTION

CROSS REFERENCE TO RELATED APPLICATIONS

The present application is a continuation of International Application No. PCT/CN2021/075199, filed on Feb. 4, 2021, which claims priorities from Chinese Patent Application No. 202010850371.4 filed on Aug. 21, 2020, all of which are hereby incorporated herein by reference.

TECHNICAL FIELD

The present invention relates to the technical field of stage lights, and more particularly, relates to a stage light with capacitive rotation angle detection.

BACKGROUND

With the expansion of stage sites, some stages are set up far away from stage lights. Particularly, in some super-large-scale performance occasions, the required stage is very large, a stage light thus needs to illuminate very far. Accordingly, positioning of the stage light is required to be accurate enough to avoid a deviation that occurs during long-distance projection.

At present, mostly, a photoelectric encoder or a magnetic encoder installed on a rotating shaft of a drive motor of a light holder or a supporting arm is used for indirectly measuring a rotation angle of the light holder or the supporting arm. Due to the fact that the photoelectric encoder or the magnetic encoder is limited in accuracy and relatively high in price, a transmission belt generally has a certain degree of elasticity, and sometimes a condition of tooth skipping may also occur, and in addition, there may be empty space between the belt and a gear, resulting in deviation between a final angle measurement result and an actual situation, existing stage lights thus are not suitable for long-distance projection positioning.

SUMMARY

In order to overcome at least one of the above-mentioned defects in the prior art, the present invention provides a stage light with capacitive rotation angle detection. The capacitive rotation angle detection is based on a principle of capacitance to directly measure a rotation angle of a pivoting member relative to a supporting member, which can obtain more accurate measurement result, resulting in more accurate projection positioning of stage lighting.

According to the present invention, the stage light with capacitive rotation angle detection includes a pivoting member and a supporting member for pivoting and supporting the pivoting member. The pivoting member rotates around a rotating center line and includes at least one light source for projecting light beams. A reflecting grating is attached on the pivoting member, which can rotate along with the pivoting member. A signal grating is attached on the supporting member. The signal grating and the reflecting grating are arranged oppositely, and center lines of the signal grating and the reflecting grating both coincide with the rotating center line of the pivoting member. The signal grating includes a plurality of capacitance emitting pieces, a capacitance receiving piece, and a shielding piece that is located between the capacitance emitting pieces and the capacitance receiving piece for avoiding direct capacitance coupling between the capacitance emitting pieces and the capacitance receiving piece. The reflecting grating includes a plurality of capacitance reflecting pieces that reflect signals sent from the capacitance emitting pieces to the capacitance receiving piece.

According to the stage light with capacitive rotation angle detection of the present invention, by directly attaching the signal grating to the supporting member to be relatively stationary, the reflecting grating is attached onto the pivoting member to rotate along with the pivoting member, and the signal grating and the reflecting grating are arranged oppositely. When working, a periodic excitation signal applied to the capacitance emitting pieces of the signal grating finally forms a composite signal on the capacitance receiving piece of the signal grating through coupling of two pairs of capacitors of the capacitance emitting pieces of the signal grating and the capacitance reflecting pieces of the reflecting grating, and the capacitance reflecting pieces of the reflecting grating and the capacitance receiving piece of the signal grating. Based on a principle of a capacitance change, with proper preventive measures, there are advantages of oil pollution prevention, dust prevention, insensitivity to air humidity and temperature and the like, a detection performance thus is more stable. A rotation angle of the pivoting member is directly measured, a deviation in a transmission process thus will not affect measurement of an actual result.

According to the present invention, the capacitance emitting pieces can be divided into multiple groups, all the groups are equal in number. The capacitance reflecting pieces are also arranged into multiple pieces corresponding to the number of the groups of the capacitance emitting pieces, and the capacitance receiving piece is a single piece which receives all signals of the capacitance emitting pieces reflected by the capacitance reflecting pieces.

The capacitance receiving piece is located at a center position of the signal grating, and the capacitance emitting pieces surround the capacitance receiving piece. In a case of the same area of the signal grating, more group of the capacitance emitting pieces can be arranged conveniently, the detection accuracy thus can be improved.

Each group of the capacitance emitting pieces are numbered clockwise or anticlockwise, circuit connecting points of the capacitance emitting pieces with the same number are all connected with a same conductive ring to connect a same circuit. The conductive ring is located on a side, away from the reflecting grating, of the capacitance emitting pieces, so that the capacitance emitting pieces of the same number can be easily connected to the same circuit.

According the present invention, distances from the circuit connecting points of the capacitance emitting pieces of the same number to a center of the signal grating are equal. In this way, the multiple conductive rings can be designed into circular and arranged in a concentric ring, which facilitates designing and processing.

Manufacturing accuracy of a capacitance-grating sensor is improved through a space averaging effect produced by the multiple groups of the capacitance emitting pieces with the same interval. Measurement accuracy can also be improved in a case of the same capacitance-grating manufacturing accuracy.

The shielding piece includes a plurality of conductive posts located between the capacitance emitting pieces and the capacitance receiving piece, and a first conductive piece located on a side, away from the reflecting grating, of the capacitance receiving piece, and the conductive post is connected to the first conductive piece. The configuration of the conductive posts enables the capacitance emitting pieces and the capacitance receiving piece to have a good shielding effect from a side close to the reflecting grating to a side away from the reflecting grating.

A projection of the first conductive piece in a direction of the rotating center line of the pivoting member covers the capacitance receiving piece and is within a range of the capacitance emitting pieces, so that the good shielding effect can be kept.

According to the present invention, the multiple pieces of the capacitance reflecting pieces are all electrically connected with a same second conductive piece. The second conductive piece is located on a side, away from the signal grating, of the capacitance reflecting pieces, and a projection of the second conductive piece in the direction of the rotating center line of the pivoting member covers the capacitance reflecting pieces. The second conductive piece plays a shielding role.

According to the present invention, the reflecting grating further includes a third conductive piece located in a same plane with the capacitance reflecting pieces, a peripheral edge of the third conductive piece has a plurality of notches. The capacitance reflecting pieces are located in the notch, correspondingly, but are not in conducting with the third conductive piece. The third conductive piece also plays a shielding role.

The capacitance emitting pieces can be specifically divided into 15 groups, there are 8 capacitance emitting pieces in each group, and the number of the capacitance reflecting pieces is also 15. The larger the number of the capacitance emitting pieces and the capacitance reflecting piece is, the higher the detection accuracy will be.

According to the present invention, a side, close to the signal grating, of the reflecting grating and a side, away from the signal grating, of the reflecting grating are both provided with an insulating protective piece. It is avoided that electrodes of the reflecting grating make contact with other elements and a short circuit is caused.

The reflecting grating is attached to a pivoting shaft of the pivoting member. The signal grating is generally arranged in the supporting member because it needs to be connected with a signal line, a terminal end of the pivoting shaft can also stretch into the supporting member, and thus, the reflecting grating without needing to be connected with a signal line is attached onto the pivoting shaft of the pivoting member so as to be detected by the signal grating.

According to the present invention, two ends of the pivoting shaft of the pivoting member run through, and a cable connecting the pivoting member and the supporting member passes through the pivoting shaft, so that the pivoting shaft provided with the reflecting grating has a wire passing function at the same time. When the pivoting member has only one pivoting shaft or when a wire needs to pass through both two pivoting shafts of the pivoting member, signal and electric energy transmitting between the pivoting member and the supporting member is still not affected.

According to the present invention, one end of a rod body is connected with the reflecting grating, and the other end of the rod body is connected with an end portion, away from the pivoting member, of the pivoting shaft. Due to the fact that a center line of a through hole formed by that the two ends of the pivoting shaft of the pivoting member run through generally coincides with the rotating center line of the pivoting member, the reflecting grating cannot be attached onto the pivoting shaft of the pivoting member conveniently, and through the rod body, it can be achieved that even if the two ends of the pivoting shaft of the pivoting member run through, a center line of the reflecting grating can also coincide with the rotating center line of the pivoting member.

The rod body is located in the pivoting shaft and arranged in parallel with the pivoting shaft. One end of the rod body is connected with the reflecting grating, and the other end of the rod body is connected with the pivoting member. When an internal space of the pivoting member is proper, the rod body is located in the pivoting shaft and directly connected with the pivoting member, which is simpler compared with a structure of connection with the end portion, away from the pivoting member, of the pivoting shaft, similarly, it can be achieved that even if the two ends of the pivoting shaft of the pivoting member run through, and the center line of the reflecting grating can also coincide with the rotating center line of the pivoting member.

According to the present invention, the reflecting grating can be annular shape, and the pivoting shaft of the pivoting member passes through the reflecting grating. That is, the reflecting grating directly sleeves an exterior of the pivoting shaft, or the reflecting grating is attached onto the pivoting member, but is arranged around the pivoting haft of the pivoting member. When the reflecting grating cannot be attached to the end portion of the pivoting shaft, this structure can still realize that the center line of the reflecting grating keeps coincident with the rotating center line of the pivoting member.

According to the present invention, a magnetic sensor attached to the pivoting member and a magnetic switch attached to the supporting member for detecting the magnetic sensor are further included. The magnetic sensor and the magnetic switch act jointly to perform starting point detection or resetting detection.

The pivoting member can be a light holder of the stage light, and the supporting member can be a supporting arm of the light holder. Or the pivoting member can be the light holder of the stage light and the supporting arm, and the supporting member can be a light base of the stage light.

At least one of a light beam shading component, a pattern reshaping component, a color rendering component, a focusing lens component, a light splitting component, an atomizing component, and a magnifying lens component is in the pivoting member.

DETAILED DESCRIPTION

Figure 1:
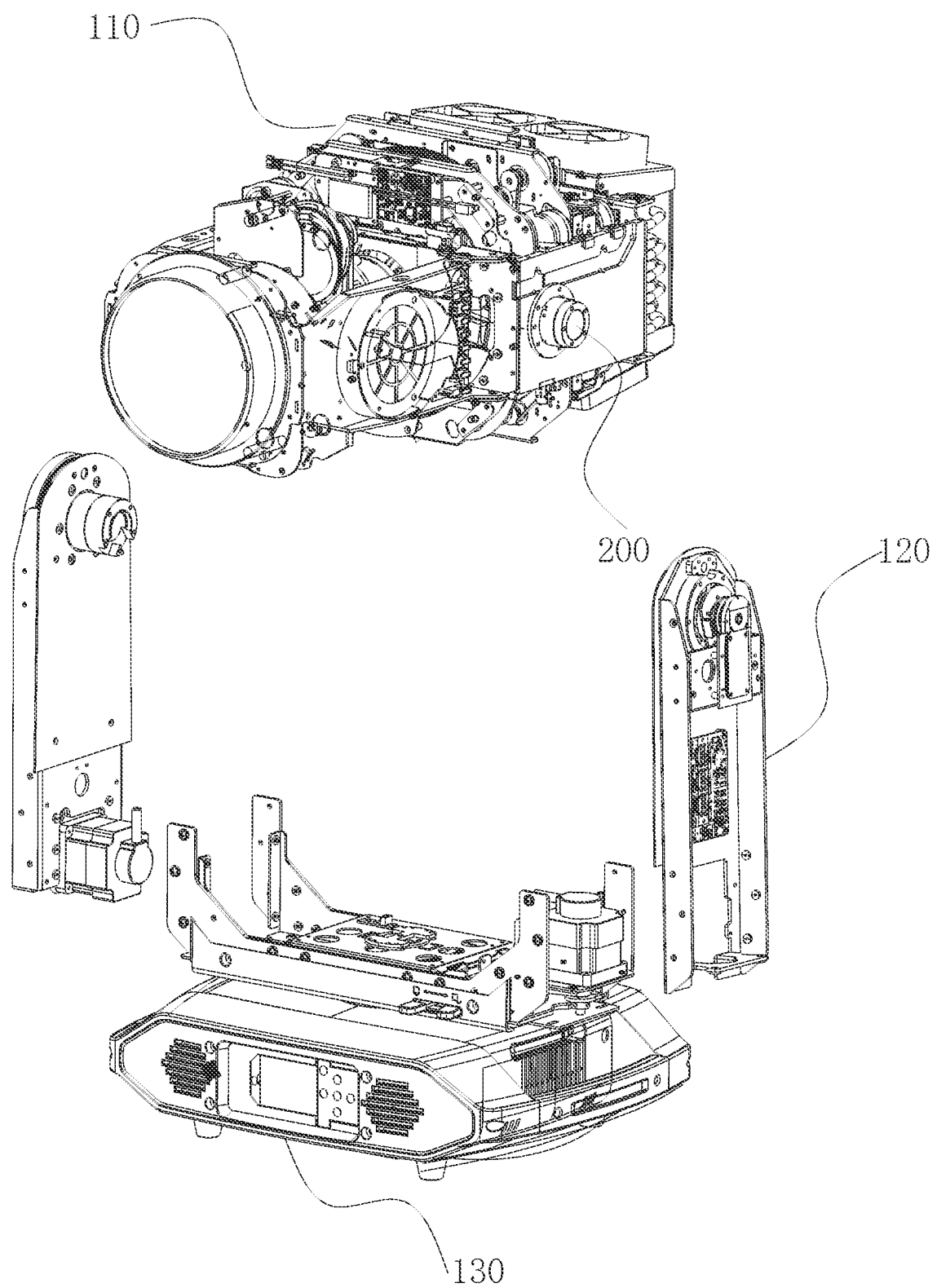
FIG. 1 is a schematic diagram of an overall structure of a stage light according to one embodiment of the present invention.

The accompanying drawings are only for illustrative descriptions and cannot be understood as a limitation of the present patent; in order to better illustrate the present embodiment, some parts of the accompanying drawings may be omitted, enlarged or reduced, and do not represent a size of an actual product; it is understandable for those skilled in the art that some well-known structures in the drawings and their descriptions may be omitted. The positional relationship described in the drawings is only for illustrative descriptions and cannot be understood as a limitation of the present patent.

As in FIG. 1 to FIG. 9, a stage light with capacitive rotation angle detection according to some embodiments is provided, which includes a pivoting member and a supporting member for pivoting and supporting the pivoting member. The pivoting member rotates around a rotating center line. The stage light further includes at least one light source for projecting light beams. A reflecting grating 400 is attached on the pivoting member, which rotates along with the pivoting member. A signal grating 300 is attached on the supporting member, which is arranged oppositely with the reflecting grating 400, Center lines of the signal grating 300 and the reflecting grating 400 both coincide with the rotating center line of the pivoting member. The signal grating 300 includes a plurality of capacitance emitting pieces 320, a capacitance receiving piece 340, and a shielding piece 350 that is located between the capacitance emitting pieces 320 and the capacitance receiving piece 340 for avoiding direct capacitance coupling between the capacitance emitting pieces 320 and the capacitance receiving piece 340. The reflecting grating 400 includes a plurality of capacitance reflecting pieces 410 that reflect signals sent from the capacitance emitting pieces 320 to the capacitance receiving piece 340.

According to the stage light with capacitive rotation angle detection, by directly attaching the signal grating 300 to the supporting member to be relatively stationary, the reflecting grating 400 is attached onto the pivoting member to rotate along with the pivoting member, and the signal grating 300 and the reflecting grating 400 are arranged oppositely. When in operation, a periodic excitation signal applied to the capacitance emitting pieces 320 of the signal grating 300 finally forms a composite signal on the capacitance receiving piece 340 of the signal grating 300 through coupling of two pairs of capacitors of the capacitance emitting pieces 320 of the signal grating 300 and the capacitance reflecting pieces 410 of the reflecting grating 400, and the capacitance reflecting pieces 410 of the reflecting grating 400 and the capacitance receiving piece 340 of the signal grating 300. Based on a principle of a capacitance change, with proper preventive measures, there are advantages of oil pollution prevention, dust prevention, insensitivity to air humidity and temperature and the like, a detection performance is thus more stable. What's more, a rotation angle of the pivoting member is directly measured, a deviation in a transmission process thus will not affect measurement of an actual result.

A working principle of the signal grating 300 and the reflecting grating 400 is that after the signal emitted by the capacitance emitting pieces 320 of the signal grating 30) is reflected by the capacitance reflecting pieces 410 of the reflecting grating 400, it is then received by the capacitance receiving piece 340 of the signal grating 300. The reflecting grating 400 thus generally does not need to be connected to any signal line, and the signal grating 300 needs to be connected to a signal line. Therefore, it is preferable to attach the reflecting grating 400 that does not need to be connected to a signal line on the rotating pivoting member, and the signal grating 300 that needs to be connected to the signal line is arranged on the supporting member, which conforms to general design routine. It should be pointed out that if the reflecting grating 400 is forcibly attached on the supporting member and the signal grating 300 is attached on the pivoting member in order to circumvent the present application, it should be regarded as an inferior design of the present application, and is also within the scope of protection of the present application.

Figure 6:
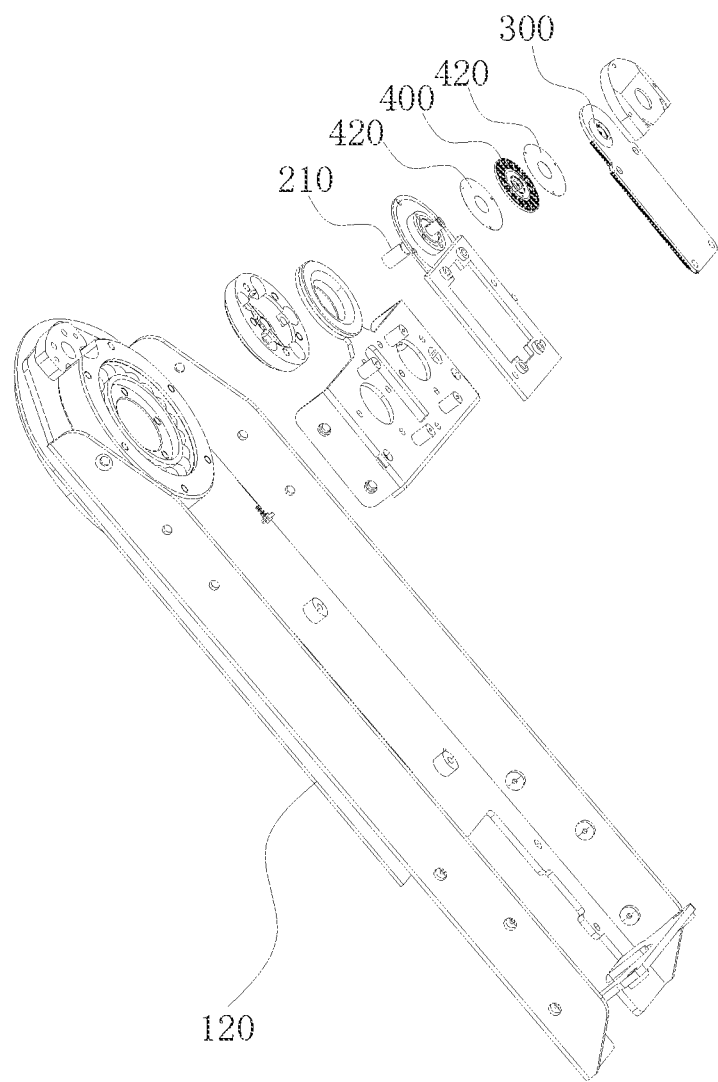
FIG. 6 is an exploded view of a connecting part of a supporting arm and a light holder according to one embodiment of the present invention.
Figure 7:
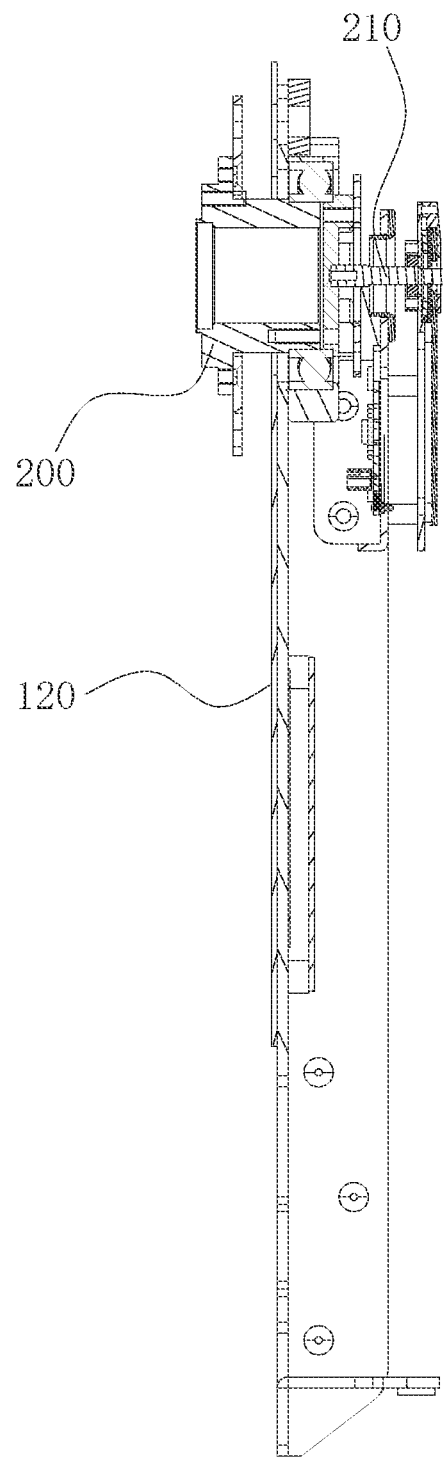
FIG. 7 is a sectional structure view of the connecting part of the supporting arm and the light holder according to the embodiment of the present invention.
Figure 8:
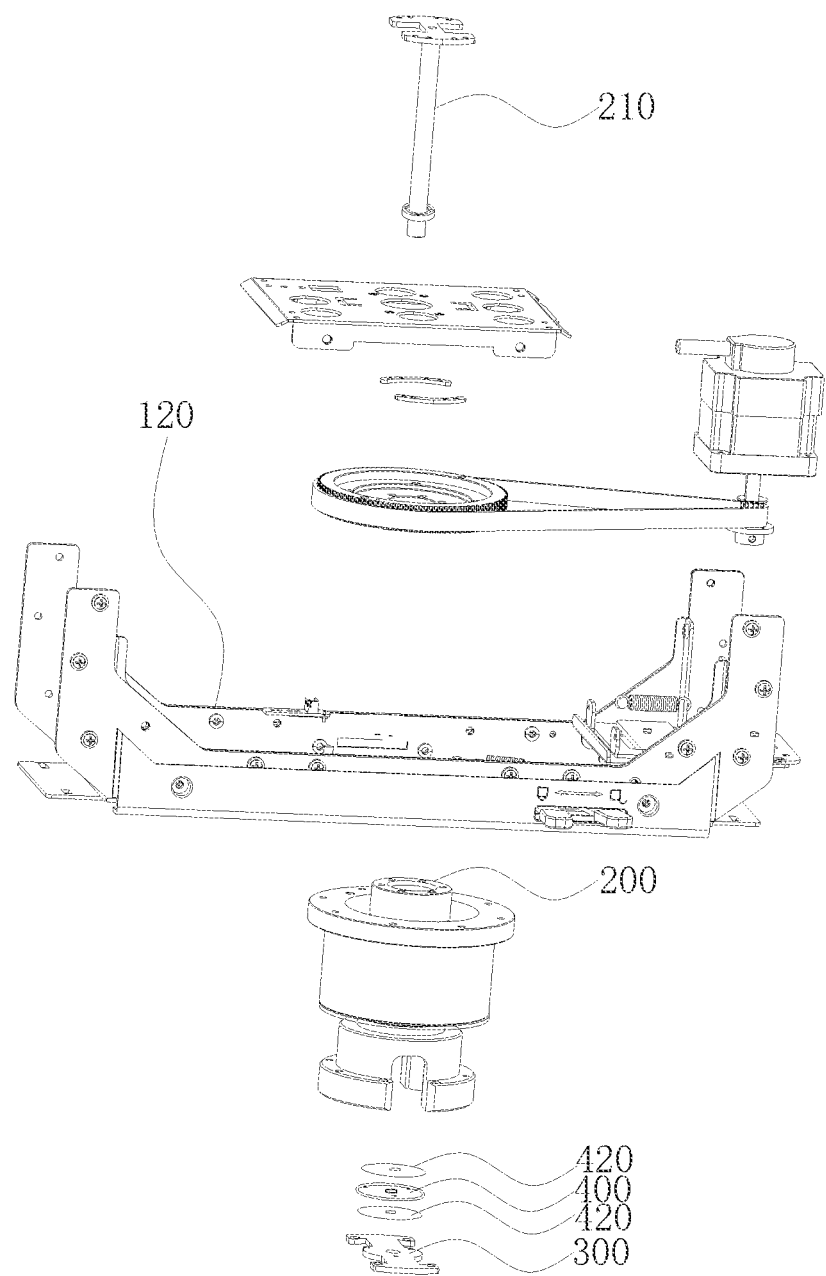
FIG. 8 is an exploded structure view of a connecting part of the supporting arm and a light base according to one embodiment of the present invention.
Figure 9:
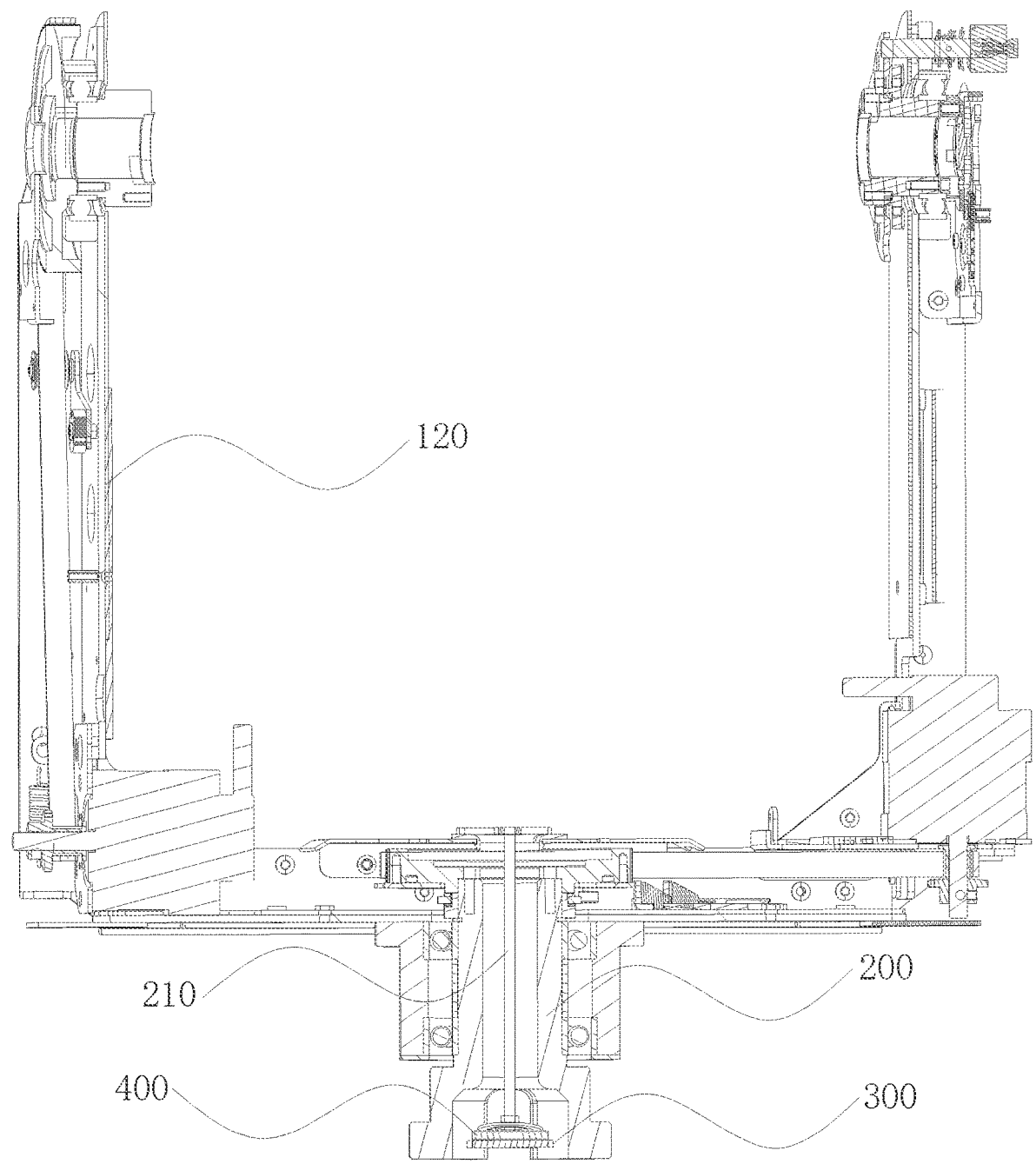
FIG. 9 is a sectional structure view of the connecting part of the supporting arm and the light base according to the embodiment of the present invention.

According to a preferred embodiment, referring to FIG. 6 and FIG. 7, the pivoting member can be a light holder 110 of the stage light, and the supporting member can be a supporting arm 120 of the light holder 110. According to other embodiments, as shown in FIG. 8 and FIG. 9, the pivoting member can be the light holder 110 of the stage light and the supporting arm 120, and the supporting member can be a light base 130 of the stage light.

In some embodiments, at least one of a light beam shading component, a pattern reshaping component, a color rendering component, a focusing lens component, a light splitting component, an atomizing component, and a magnifying lens component is arranged in the pivoting member. The various above-mentioned components are generally located in the light holder 110 of the stage light, and respectively realize effects of shading peripheries of a light beam, reshaping patterns of the light beam, rendering colors of the light beam, adjusting a focus of the light beam, splitting the light beam, homogenizing light of the light beam, and magnifying light spots.

Figure 2:
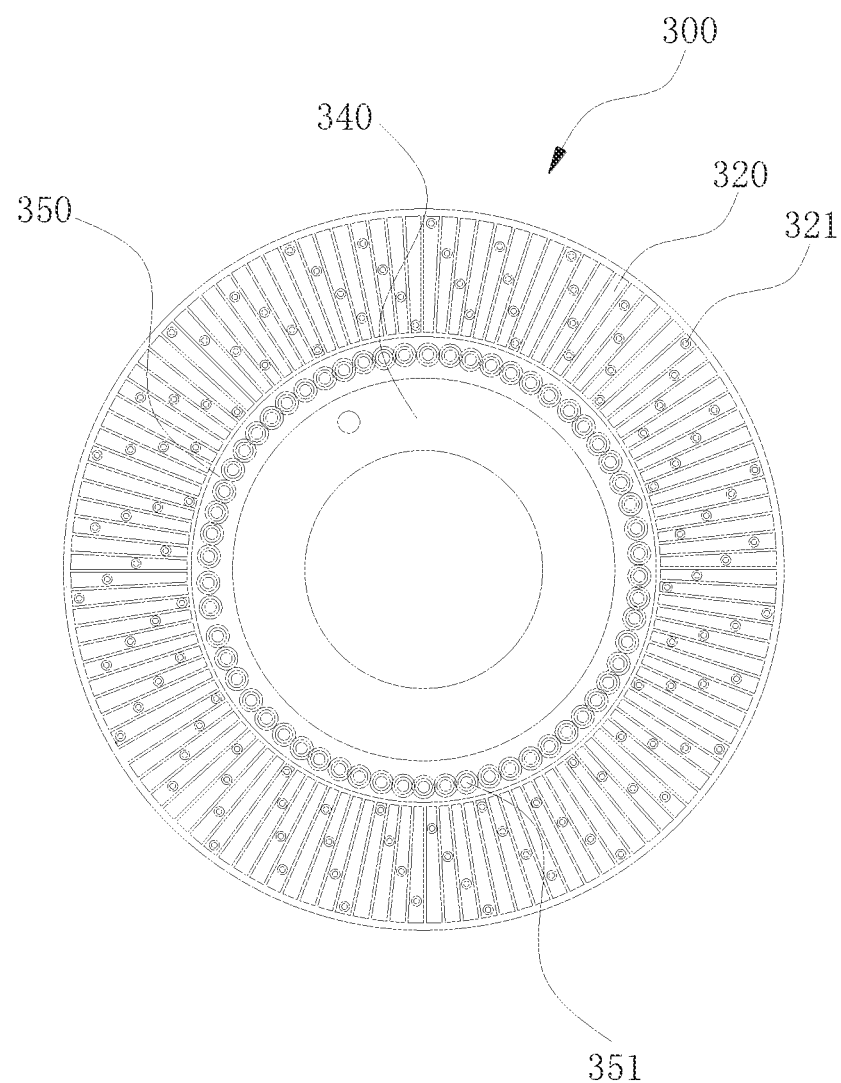
FIG. 2 is a front view of a signal grating according to one embodiment of the present invention.
Figure 4:
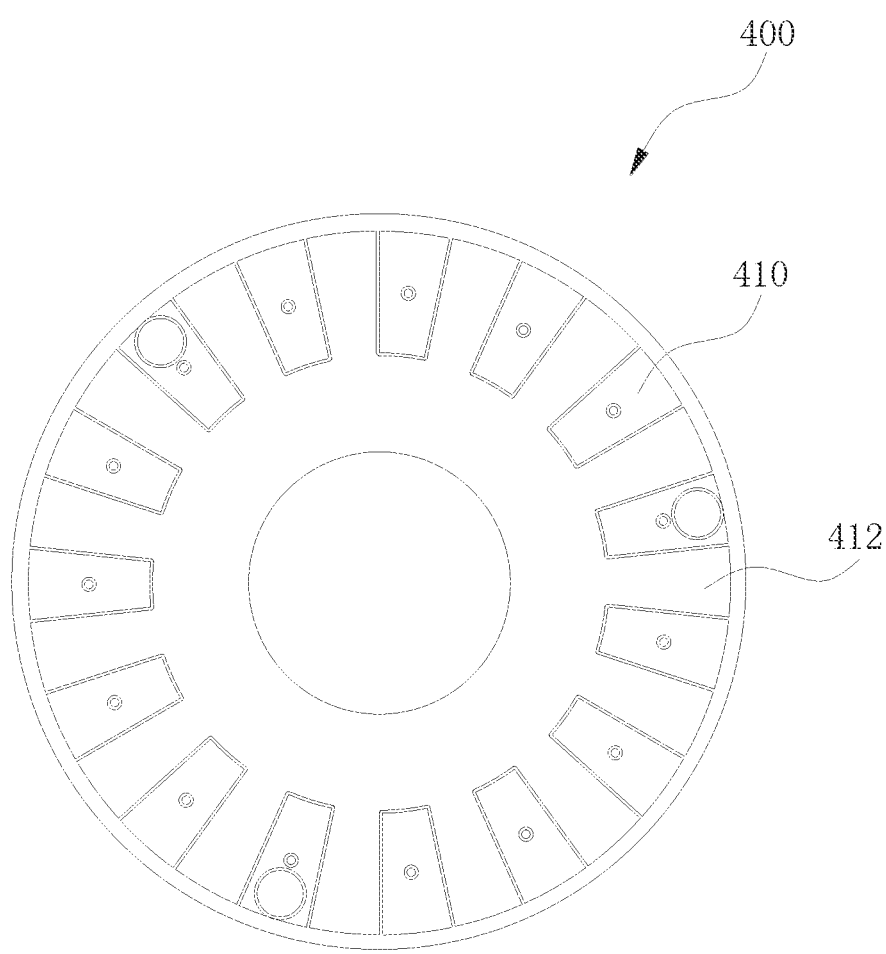
FIG. 4 is a front view of a reflecting grating according to one embodiment of the present invention.

As in FIG. 2 and FIG. 4, according to these embodiments, the capacitance emitting pieces 320 are divided into multiple groups, all the groups are equal in number. The capacitance reflecting pieces 410 are also arranged into multiple pieces corresponding to the number of the groups of the capacitance emitting pieces 320, and the capacitance receiving piece 340 is a single piece which receives all signals of the capacitance emitting pieces 320 reflected by the capacitance reflecting pieces 410.

In a preferred embodiment, the capacitance receiving piece 340 is located at a center position of the signal grating 300, and the capacitance emitting pieces 320 surround the capacitance receiving piece 340. In a case of the same area of the signal grating 300, more capacitance emitting pieces 320 in such configuration can be arranged conveniently, thus improving detection accuracy.

Figure 3:
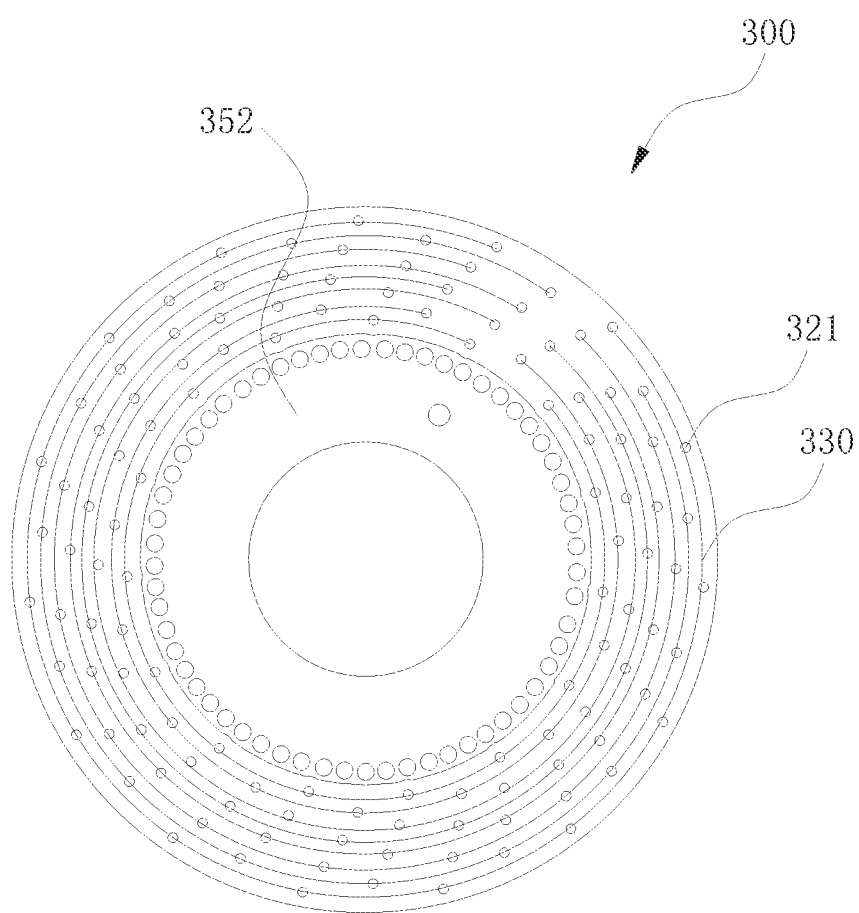
FIG. 3 is a back view of the signal grating according to the embodiment of the present invention.

As in FIG. 2 and FIG. 3, in the embodiment, each group of the capacitance emitting pieces 320 are numbered clockwise or anticlockwise, circuit connecting points 321 of the capacitance emitting pieces 320 with the same number are all connected with a same conductive ring 330 to connect a same circuit. The conductive ring 330 is located on a side, away from the reflecting grating 400, of the capacitance emitting pieces 320, so that the capacitance emitting pieces 320 of the same number can be easily connected to the same circuit.

In a preferred embodiment, distances from the circuit connecting points 321 of the capacitance emitting pieces 320 with the same number to a center of the signal grating 300 are equal. In this way, the multiple conductive rings 330 can be designed into circular and arranged in a concentric ring, which facilitates designing and processing.

In a preferred embodiment, the shielding piece 350 includes a plurality of conductive posts 351 located between the capacitance emitting pieces 320 and the capacitance receiving piece 340, and a first conductive piece 352 located on a side, away from the reflecting grating 400, of the capacitance receiving piece 340. The conductive posts 351 are connected to the first conductive piece 352. The configuration of the conductive posts 351 enables the capacitance emitting pieces 320 and the capacitance receiving piece 340 to have a good shielding effect from a side close to the reflecting grating 400 to a side away from the reflecting grating 400. In the present embodiment, the conductive posts 351 are arranged closely, and an interval between each other is less than 1 mm.

In a preferred embodiment, a projection of the first conductive piece 352 in a direction of the rotating center line of the pivoting member covers the capacitance receiving piece 340 and is within a range of the capacitance emitting pieces 320, so that good shielding effect can be kept.

Figure 5:
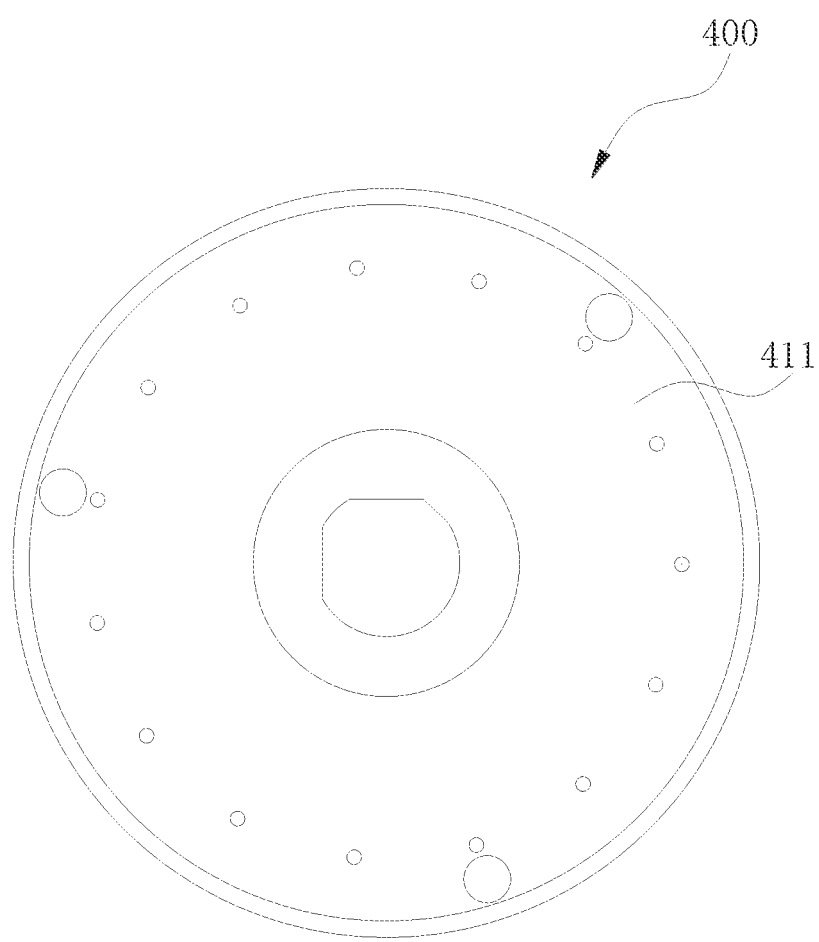
FIG. 5 is a back view of the reflecting grating according to the embodiment of the present invention.

As in FIG. 4 and FIG. 5, in a preferred embodiment, the multiple pieces of capacitance reflecting pieces 410 are all electrically connected with a same second conductive piece 411. The second conductive piece 411 is located on a side, away from the signal grating 300, of the capacitance reflecting pieces 410, and a projection of the second conductive piece 411 in the direction of the rotating center line of the pivoting member covers the capacitance reflecting pieces 410. The second conductive piece 411 plays a shielding role.

In a preferred embodiment, the reflecting grating 400 further includes a third conductive piece 412 located in a same plane with the capacitance reflecting pieces 410, a peripheral edge of the third conductive piece 412 has a plurality of notches, in which the capacitance reflecting pieces 410 are correspondingly located. However, the capacitance reflecting pieces 410 are not in conducting with the third conductive piece 412. The third conductive piece 412 also plays a shielding role.

As in FIG. 2, in a preferred embodiment, the capacitance emitting pieces 320 are divided into 15 groups, there are 8 capacitance emitting pieces in each group, and the number of the capacitance reflecting pieces 410 is also 15. The larger the number of the capacitance emitting pieces 320 and the capacitance reflecting pieces 410 is, the higher the detection accuracy will be.

According to an embodiment, each group of the capacitance emitting pieces 320 is numbered from A to H, the capacitance emitting pieces 320 with the same number are connected to the same circuit, 8 equal amplitude and same frequency square wave excitation voltage signals with each phase difference by $\pi/4$ are respectively added on the capacitance emitting pieces 320 numbered A-H. The same excitation signal is applied to each group of the capacitance emitting pieces 320 with the same number, and after coupling of two pairs of capacitors, i.e. the capacitance emitting pieces 320 and the capacitance reflecting pieces 410, and the capacitance reflecting pieces 410 and the capacitance receiving piece 340, a capacitance-grating voltage signal is formed on the capacitance receiving piece 340.

As in FIG. 6 and FIG. 8, in a preferred embodiment, a side, close to the signal grating 300, of the reflecting grating 400 and a side, away from the signal grating 300, of the reflecting grating 400 are both provided with an insulating protective piece 420. It is avoided that electrodes of the reflecting grating 400 make contact with other elements, causing a short circuit. A shape and a size of the insulating protective piece 420 corresponds to those of the reflecting grating 400.

In a preferred embodiment, the reflecting grating 400 is attached to a pivoting shaft 200 of the pivoting member. The signal grating 300 is generally arranged in the supporting member because it needs to be connected with a signal line, a terminal end of the pivoting shaft 200 can also stretch into the supporting member, thus, the reflecting grating 400 without needing to be connected with a signal line is attached onto the pivoting shaft 200 of the pivoting member so as to be detected by the signal grating 300.

In a preferred embodiment, two ends of the pivoting shaft 200 of the pivoting member run through, and a cable connecting the pivoting member and the supporting member passes through the pivoting shaft 200, so that the pivoting shaft 200 provided with the reflecting grating 400 has a wire passing function at the same time. Even when the pivoting member has only one pivoting shaft 200 or w % ben a wire needs to pass through both two pivoting shafts 200 of the pivoting member, signal and electric energy transmitting between the pivoting member and the supporting member will still not be affected.

As in FIG. 6 and FIG. 7, in a preferred embodiment, one end of a rod body 210 is connected with the reflecting grating 400, and the other end thereof is connected with an end portion, away from the pivoting member, of the pivoting shaft 200. Due to the fact that a center line of a through hole formed by that the two ends of the pivoting shaft 200 of the pivoting member run through generally coincides with the rotating center line of the pivoting member, the reflecting grating 400 cannot be attached onto the pivoting shaft 200 of the pivoting member conveniently. While through the rod body 210, it can be achieved that even if the two ends of the pivoting shaft 200 of the pivoting member run through, a center line of the reflecting grating 400 can also coincide with the rotating center line of the pivoting member. In the present embodiment, the pivoting member is the light holder 110 of the stage light, the supporting member is the supporting arm 120 of the light holder 110, and due to the fact that elements in the light holder 110 are numerous, a space is limited, and the rod body 210 is inconvenient to install and fix, the rod body 210 is directly connected with the end portion of the pivoting shaft 200 of the light holder 110.

As in FIG. 8 and FIG. 9, in a preferred embodiment, the rod body 210 is located in the pivoting shaft 200 and arranged in parallel with the pivoting shaft 200. One end of the rod body 210 is connected with the reflecting grating 400, and the other end thereof is connected with the pivoting member. When an internal space of the pivoting member is proper, the rod body 210 is located in the pivoting shaft 200 and directly connected with the pivoting member, which is simpler compared with a structure of connection with the end portion, away from the pivoting member, of the pivoting shaft 200, and similarly, it can be achieved that even if the two ends of the pivoting shaft 200 of the pivoting member run through. The center line of the reflecting grating 400 can also coincide with the rotating center line of the pivoting member. In the present embodiment, the pivoting member is the light holder 110 of the stage light and the supporting arm 120, and the supporting member is the light base 130 of the stage light.

In a preferred embodiment, the reflecting grating 400 is in annular shape, and the pivoting shaft 200 of the pivoting member passes through the reflecting grating 400. That is, the reflecting grating 400 directly sleeves outside the pivoting shaft 200, or the reflecting grating 400 is attached onto the pivoting member, but is arranged around the pivoting shaft 200 of the pivoting member. When the reflecting grating 400 cannot be attached to the end portion of the pivoting shaft 200, such structure can still realize that the center line of the reflecting grating 400 keep coincident with the rotating center line of the pivoting member.

In a preferred embodiment, a magnetic sensor attached to the pivoting member and a magnetic switch attached to the supporting member for detecting the magnetic sensor are further included. The magnetic sensor and the magnetic switch act jointly to perform starting point detection or resetting detection.

Obviously, the above-mentioned embodiments of the present invention are merely examples to clearly illustrate the present invention, and are not intended to limit the implementation modes of the present invention. For those of ordinary skill in the art, other changes or modifications in different forms can also be made on the basis of the above description. It is unnecessary and impossible to list all the implementation modes here. Any modification, equivalent replacement, improvement and the like made within the spirit and principle of the present invention shall be included in the protection scope of the claims of the present invention.

The invention claimed is:

1. A stage light with capacitive rotation angle detection, comprising:
   a pivoting member, which rotates around a rotating center line and comprises at least one light source producing projecting light beams; and
   a supporting member for pivoting and supporting the pivoting member,
   wherein a reflecting grating is attached on the pivoting member, which is configured to rotate along with the pivoting member,
   a signal grating is attached on the supporting member, the signal grating and the reflecting grating are arranged oppositely, and center lines of the signal grating and the reflecting grating are both coincident with the rotating center line of the pivoting member,
   the signal grating comprises a plurality of capacitance emitting pieces, a capacitance receiving piece, and a shielding piece that is located between the capacitance emitting pieces and the capacitance receiving piece for avoiding direct capacitance coupling between the capacitance emitting pieces and the capacitance receiving piece,
   the reflecting grating comprises a plurality of capacitance reflecting pieces that reflect signals sent from the capacitance emitting pieces to the capacitance receiving piece, and
   wherein the capacitance emitting pieces are divided into multiple groups, all the groups are equal in a number of the capacitance emitting pieces, a number of the capacitance reflecting pieces corresponds to a number of the groups of the capacitance emitting pieces, and the capacitance receiving piece is a single piece which is configured to receive all signals of the capacitance emitting pieces reflected by the capacitance reflecting pieces.

2. The stage light with capacitive rotation angle detection according to claim 1, wherein, the capacitance receiving piece is located at a center of the signal grating, and the capacitance emitting pieces are arranged surrounding the capacitance receiving piece.

3. The stage light with capacitive rotation angle detection according to claim 2, wherein, each group of the capacitance emitting pieces is numbered clockwise or anticlockwise, circuit connecting points of the capacitance emitting pieces with same number are all connected with a same conductive ring and then are connected to a same circuit, and the conductive ring is located on a side, away from the reflecting grating, of the capacitance emitting pieces.

4. The stage light with capacitive rotation angle detection according to claim 3, wherein, distances from the circuit connecting points of the capacitance emitting pieces with the same number to a center of the signal grating are equal.

5. The stage light with capacitive rotation angle detection according to claim 2, wherein, the shielding piece comprises a plurality of conductive posts located between the capacitance emitting pieces and the capacitance receiving piece, and a first conductive piece located on a side, away from the reflecting grating, of the capacitance receiving piece, and the conductive post is connected to the first conductive piece.

6. The stage light with capacitive rotation angle detection according to claim 5, wherein, a projection of the first conductive piece in a direction of the rotating center line of the pivoting member covers the capacitance receiving piece and is within a range of the capacitance emitting pieces.

7. The stage light with capacitive rotation angle detection according to claim 1, wherein, the plurality of capacitance reflecting pieces are all electrically connected with a same second conductive piece, the second conductive piece is located on a side, away from the signal grating, of the capacitance reflecting piece, and a projection of the second conductive piece in the direction of the rotating center line of the pivoting member covers the capacitance reflecting piece.

8. The stage light with capacitive rotation angle detection according to claim 1, wherein, the reflecting grating further comprises a third conductive piece located in a same plane with the capacitance reflecting pieces, a peripheral edge of the third conductive piece has a plurality of notches, and the capacitance reflecting pieces are located in the notch correspondingly, but are not in conducting with the third conductive piece.

9. The stage light with capacitive rotation angle detection according to claim 1, wherein, the capacitance emitting pieces are divided into 15 groups, there are 8 capacitance emitting pieces in each group, and the number of the capacitance reflecting pieces is also 15.

10. The stage light with capacitive rotation angle detection according to claim 1, wherein, a side, close to the signal grating, of the reflecting grating and a side, away from the signal grating, of the reflecting grating are both provided with an insulating protective piece.

11. The stage light with capacitive rotation angle detection according to claim 1, wherein, the reflecting grating is attached onto a pivoting shaft of the pivoting member.

12. The stage light with capacitive rotation angle detection according to claim 11, wherein, the pivoting shaft of the pivoting member is penetrated.

13. The stage light with capacitive rotation angle detection according to claim 12, wherein, one end of a rod body is connected with the reflecting grating, and the other end of the rod body is connected with an end portion, away from the pivoting member, of the pivoting shaft.

14. The stage light with capacitive rotation angle detection according to claim 12, wherein, a rod body is located in the pivoting shaft and arranged in parallel with the pivoting shaft, one end of the rod body is connected with the reflecting grating, and the other end of the rod body is connected with the pivoting member.

15. The stage light with capacitive rotation angle detection according to claim 1, wherein, the reflecting grating is in annular shape, and a pivoting shaft of the pivoting member passes through the reflecting grating.

16. The stage light with capacitive rotation angle detection according to claim 1, further comprising:
- a magnetic sensor attached to the pivoting member; and
- a magnetic switch attached to the supporting member for detecting the magnetic sensor.

17. The stage light with capacitive rotation angle detection according to claim 1, wherein, the pivoting member includes a light holder of the stage light, and the supporting member includes a supporting arm of the light holder; or
  wherein the pivoting member includes a light holder of the stage light and a supporting arm of the light holder, and the supporting member is a light base of the stage light.

18. The stage light with capacitive rotation angle detection according to claim 1, wherein, at least one of a light beam shading component, a pattern reshaping component, a color rendering component, a focusing lens component, a light splitting component, an atomizing component, and a magnifying lens component is provided in the pivoting member.

* * * * *